Figure 1:
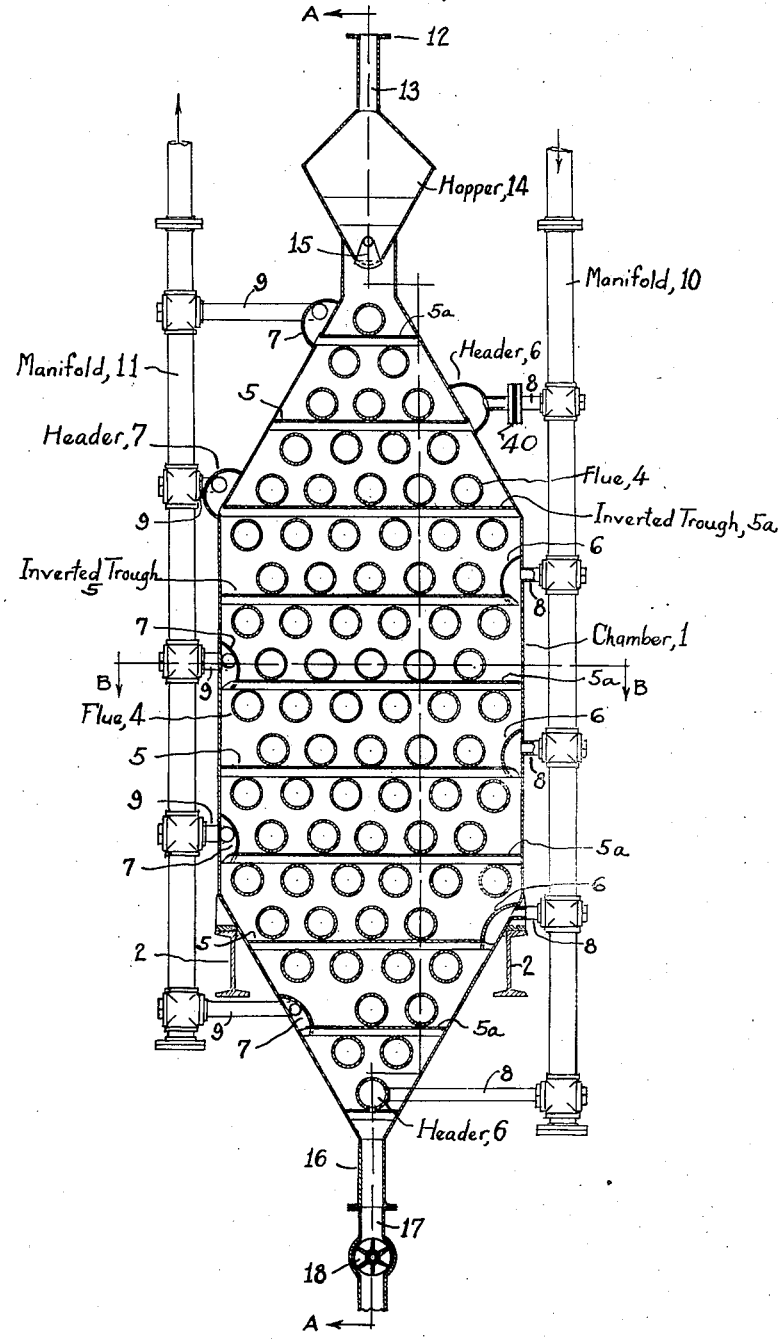

April 25, 1933.   E. O. BARSTOW ET AL   1,905,883
APPARATUS FOR CONTACTING SOLID AND GASEOUS MATERIALS
Filed Feb. 13, 1930   6 Sheets-Sheet 3

INVENTORS
Edwin O. Barstow 2nd
BY Sheldon B. Heath
Thomas Griswold, Jr.
ATTORNEY April 25, 1933.   E. O. BARSTOW ET AL   1,905,883
APPARATUS FOR CONTACTING SOLID AND GASEOUS MATERIALS
Filed Feb. 13, 1930   6 Sheets-Sheet 4

INVENTORS
Edwin O. Barstow and
BY Sheldon B. Heath
Thomas Griswold, Jr.
ATTORNEY April 25, 1933.　　　E. O. BARSTOW ET AL　　　1,905,883
APPARATUS FOR CONTACTING SOLID AND GASEOUS MATERIALS
Filed Feb. 13, 1930　　　6 Sheets-Sheet 5

INVENTORS
Edwin O. Barstow and
BY　Sheldon B. Heath
Thomas Griswold, Jr.
ATTORNEY April 25, 1933.  E. O. BARSTOW ET AL  1,905,883
APPARATUS FOR CONTACTING SOLID AND GASEOUS MATERIALS
Filed Feb. 13, 1930  6 Sheets-Sheet 6

INVENTORS
Edwin O. Barstow and
Sheldon B. Heath
BY Thomas Griswold, Jr.
ATTORNEY Patented Apr. 25, 1933

1,905,883

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

APPARATUS FOR CONTACTING SOLID AND GASEOUS MATERIALS

Application filed February 13, 1930. Serial No. 428,066.

The present invention has reference to methods and apparatus for contacting solid and gaseous materials wherein a body of solid material in divided or comminuted form must be maintained at a temperature ranging from ordinary temperature to a moderately elevated temperature wholly or to a large degree by the application of external heating or cooling while subjecting the same to the action of a gas. In a co-pending application Ser. No. 428,065, filed Feb. 13, 1930, now Patent No. 1,852,227 we have claimed the method hereinafter described. The present application is directed specifically to apparatus adapted for carrying out such method.

An object of the invention is to secure a uniform distribution of the external heat supplied or abstracted throughout the body of solid material by passing streams of heated or cooled aeriform gases through a plurality of tubes or conduits distributed within said body. A further object is to provide for a uniform distribution of the gas throughout the body of solid material by introducing the same thereinto through a plurality of outlets disposed within said body. Another object is to preheat or precool the gas approximately to the desired temperature before contacting the same with the body of solid material, such preheating or precooling being effected through the agency of the same medium that is employed for heating or cooling the solid material. Still another object is to conserve the heat content of the heating gases, where such are employed, by constantly recirculating the same and adding thereto only such increment of heat as required to compensate for the heat expended in maintaining the temperature of the reacting materials and in losses. A design is also provided for a special type of apparatus adapted to the carrying out of the method under the conditions herein set forth. These and other objects and advantages will appear from the annexed drawings and following description, setting forth in detail several of the various ways in which the principle of the invention may be used.

In said annexed drawings:—

Figure 2:
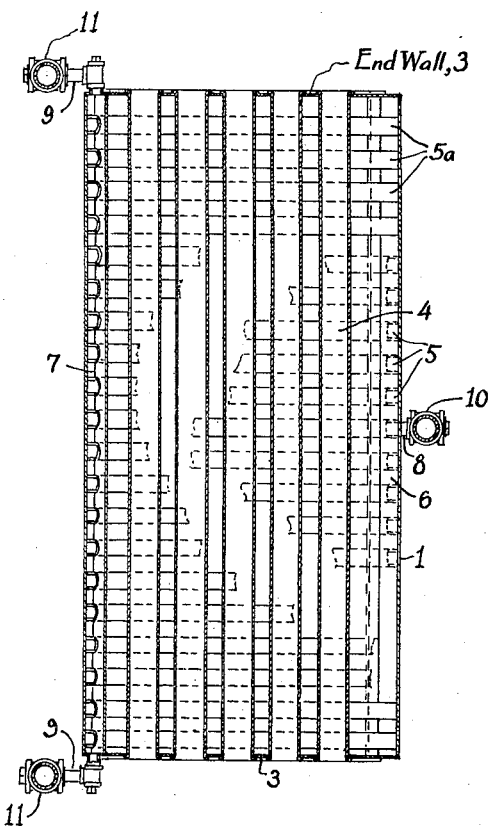
Figure 4:
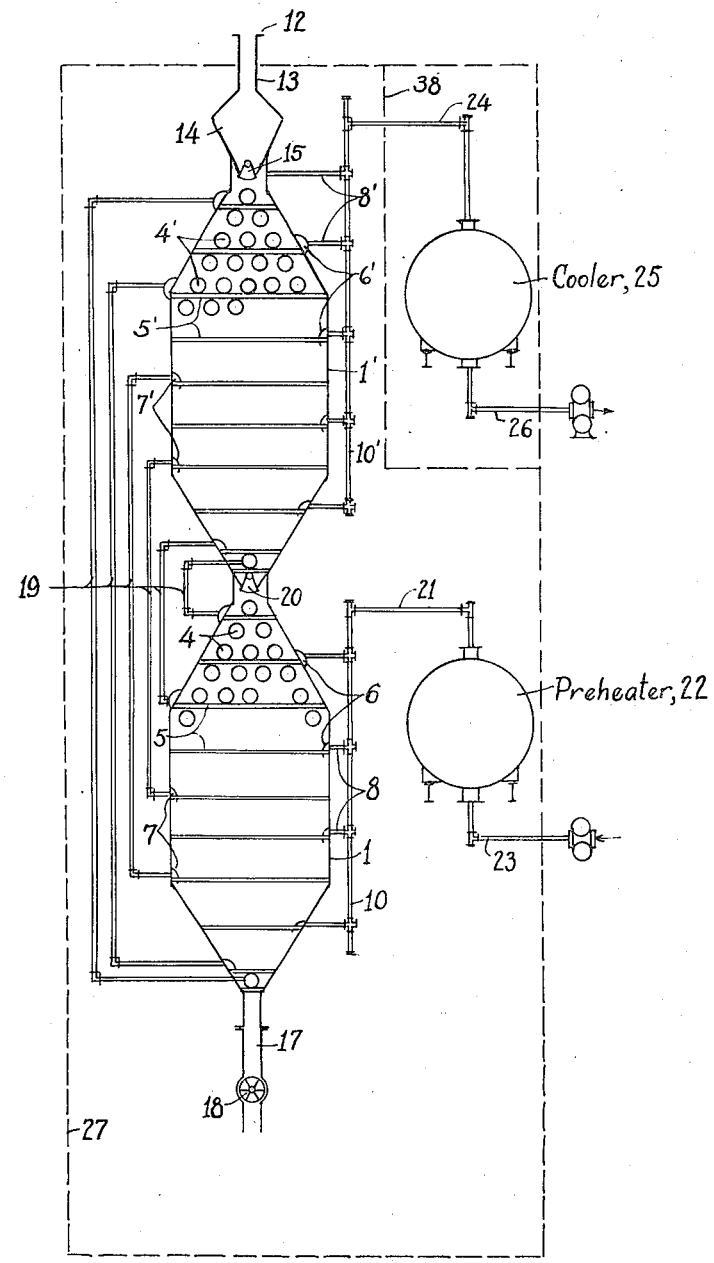
Figure 5:
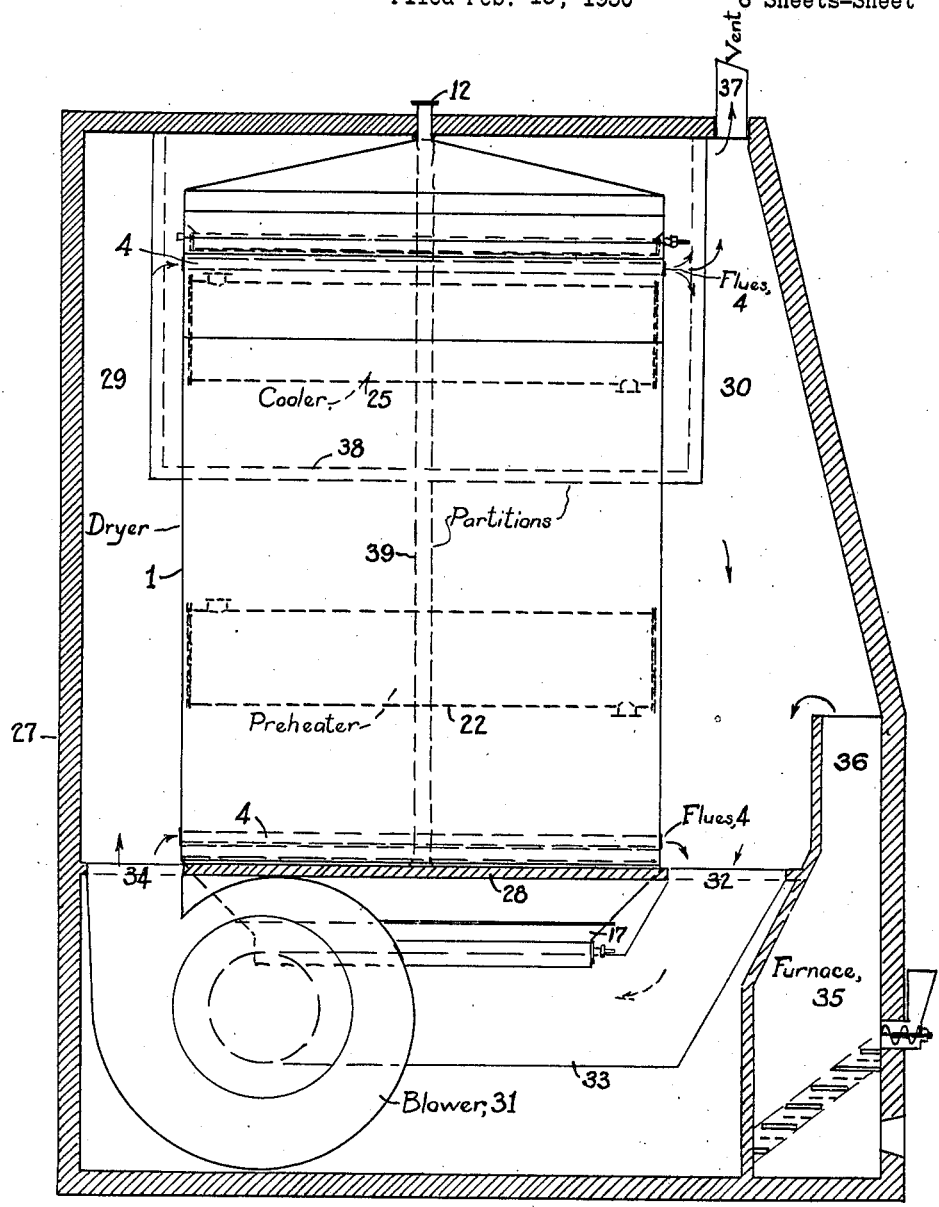
Figure 6:
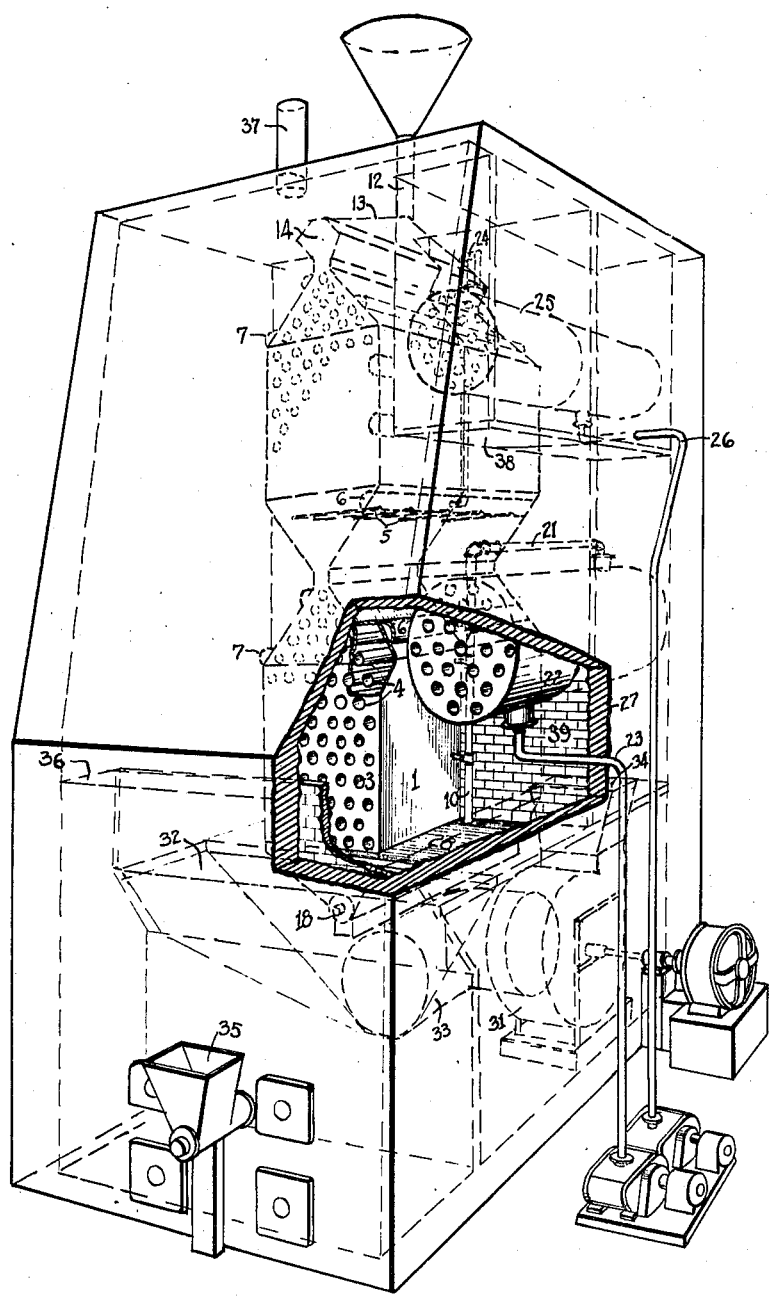

Fig. 1 is a vertical cross-section through a chamber adapted for simultaneously heating or cooling a body of solid material and intimately contacting a gas therewith. Fig. 2 is a horizontal section on the line B—B and Fig. 3 a vertical cross-section on the line A—A of Fig. 1. Fig. 4 shows a superposed duplex arrangement of two chamber units together with gas-line connections therefor. Fig. 5 is a vertical section of an assembly including a reaction chamber together with circulating means for distributing heating gases and a furnace for supplying the same, all enclosed within a single housing. Fig. 6 shows in perspective a general assembly of the apparatus, with sections broken away to bring out details of interior arrangement.

The invention is particularly applicable for reactions or operations wherein hydrochloric acid gas is contacted with a solid material in divided form at a suitably elevated temperature. More particularly is it adapted for dehydrating magnesium chloride in an atmosphere or current of hydrochloric acid gas. The detailed description hereinafter provided sets forth such last-named application specifically, but the same is to be regarded equally as an illustrative example showing the broad principle underlying the invention.

Figure 3:
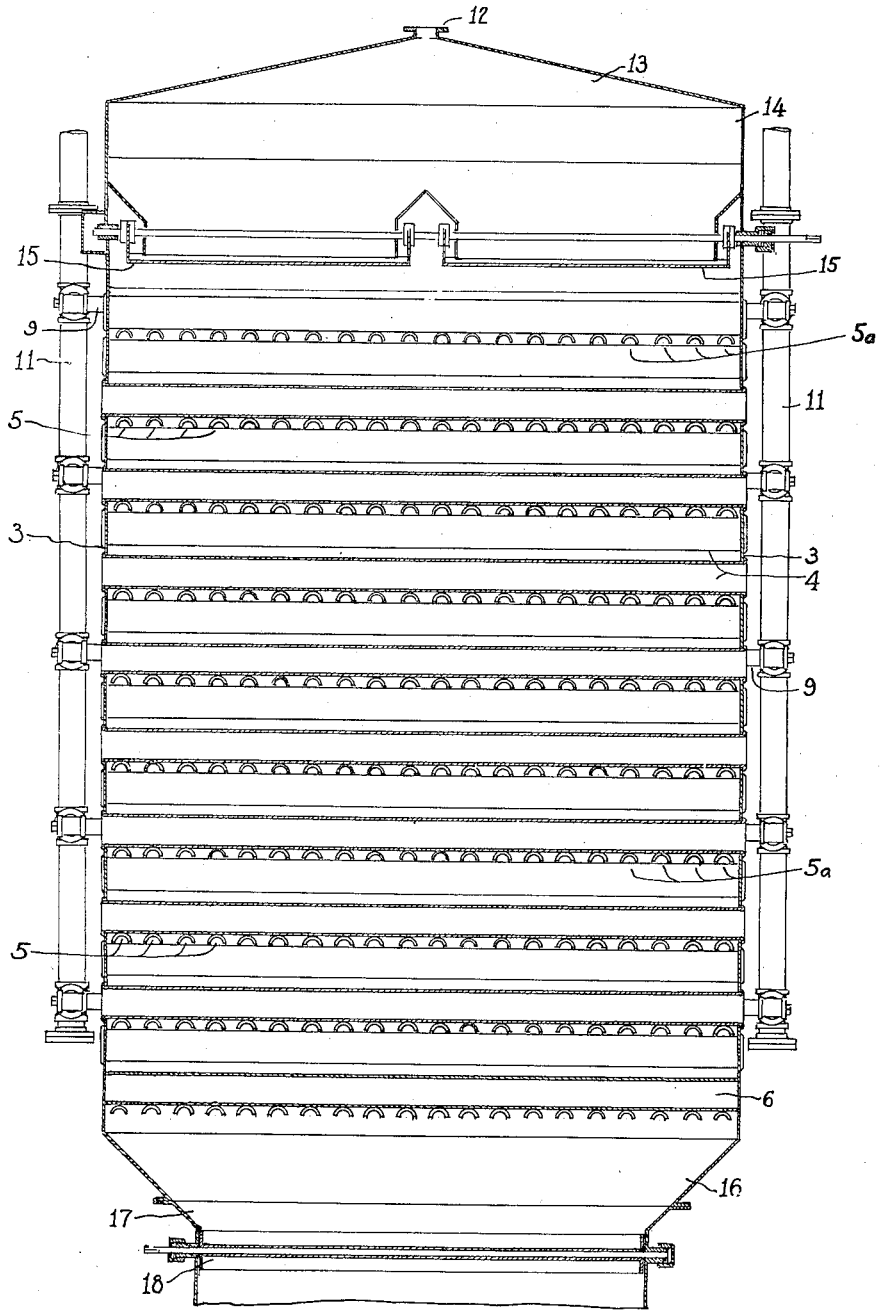

Referring to the drawings, in Figs. 1, 2 and 3 a dryer or reactor chamber 1 is shown, having lateral walls parallel in mid-section but converging at the upper and lower ends thereof, the whole being borne by supporting members 2. The end walls 3, conforming in shape to the cross-sectional view shown in Fig. 1, constitute tube sheets into which are welded a plurality of tubes or flues 4 extending lengthwise of chamber 1, the ends thereof being left open. Tubes 4 are preferably arranged in banks or rows uniformly spaced apart, the spacing of the tubes preferably being approximately equal to the tube radius, or generally not exceeding the diameter of the tubes. Extending transversely of chamber 1 and secured to the lateral walls thereof between alternate banks of tubes are gas distributors 5 and 5a in the form of inverted troughs, likewise equally spaced in rows, and opening downwardly into the space within chamber 1. The rows of troughs 5 and 5a are alternately arranged, the former terminating in headers 6 at one side of chamber 1 and extending lengthwise thereof, and the latter terminating in similar headers 7 at the opposite side. Headers 6 are connected by laterals 8 with manifold 10 centrally located at one side of chamber 1, and headers 7 are connected by laterals 9 with two communicating manifolds 11 located at each end of the opposite side of chamber 1. A charging inlet 12 leads through a tapered passage 13 into a hopper 14 extending the full length of chamber 1 and communicating therewith through gate 15. A tapered discharge chute 16 leads from the bottom of chamber 1 to outlet 17 controlled by valve 18.

Fig. 4 shows diagrammatically a preferred apparatus arrangement consisting of two units of the type illustrated in Figs. 1—3, one being superimposed upon the other. Such arrangement involves a modified layout of piping for connecting between the two separate units. Hence, employing like reference characters for like apparatus elements as in Figs. 1—3, 1 and 1' are the dryer chambers similarly provided with tubes 4 and 4', inverted troughs or distributors 5 and 5', and headers 6 and 6', the latter connected by pipes 8 and 8' to manifolds 10 and 10'. Headers 7 and 7' are likewise disposed in identical fashion as in Fig. 1, but are interconnected here by means of pipes 19, such connection being advantageously made between oppositely located pairs of headers as shown. Feed inlet 12, passage 13, hopper 14 and gate 15 are provided as before, while the opening between chambers 1 and 1' is controlled by gate 20. Outlet 17 serves for bottom discharge from the apparatus. Manifold 10 is connected by pipe 21 with a preheater 22, which may be in the form of a tubular heat exchanger, the inlet to which is pipe 23 in turn connected to the blower as shown. Similarly pipe 24 connects manifold 10' with cooler 25 of similar form and having an outlet pipe 26 connected to an exhauster.

The apparatus shown in Figs. 1—4 is to be enclosed within a heat-insulated housing which is illustrated diagrammatically in Fig. 5. In said Fig. 5 housing 27 is divided into two parts by horizontal partition 28. In the upper part thereof is placed dryer 1, which may be either a single or double unit, leaving a fore-compartment 29 and an after-compartment 30 communication between which is established through tubes or flues 4, such compartments being separated from each other in the space at either side of chamber 1 by cross-walls or partitions indicated by dotted lines at 39. In the lower part of housing 27 is placed a fan or blower 31 which draws from compartment 30 through opening 32 and duct 33 and discharges into compartment 29 through opening 34. A furnace 35, suitably equipped for the combustion or solid, liquid or gaseous fuel (here shown for using solid fuel) is likewise included within housing 27, the products of combustion passing through flue 36 directly into compartment 30, and from the latter a vent 37 is provided. Inlet 12 to dryer 1 extends above the top of housing 27, while discharge outlet 17 is connected to a suitable conveyer (not shown for removal of finished prdouct outside of housing 27. Preheater 22 is preferably located within housing 27, and cooler 25 may likewise be placed therein but separated from the other apparatus by an inner partition indicated by dotted line 38.

In Fig. 4 housing 27 and partition 38 are indicated by the dotted lines. A general assembly of the herein described apparatus, viewed from the furnace end of the casing, is represented in Fig. 6. The relative arrangement of parts in the complete apparatus will be readily apparent therefrom. Interior details, shown partly in the broken away sections and partly by dotted lines, correspond to features more particularly illustrated in Figs. 1—5, and are indicated by like reference numerals.

For operating the apparatus just described, chamber 1 is completely filled in the spaces surrounding the flues 4 with the solid material in divided form, e. g. partially dehydrated magnesium chloride containing from 1 to 2 molecules of water of crystallization, such material being charged through inlet 12 in quantity sufficient at least partially to fill hopper 14 in addition to filling chamber 1 completely. The excess material in hopper 14 may be fed down into chamber 1 as the process continues to make up for shrinkage in the charge. The charge is heated to the desired treating temperature by passing hot combustion gases through flues 4, the disposition of the flues permitting a rapid and substantially uniform heating of the entire charge. The gas to be reacted or contacted with the solid material, e. g. dry hydrochloric acid gas, is admitted through manifold 10 and laterals 8 into headers 6, and thence into inverted distributing troughs 5 whence it passes into the charge of solid material and permeates the mass thereof by diffusion. Laterals 8 are advantageously provided with adjustable orifices 40, as indicated in Fig. 1 to proportion the volume of gas flow therethrough to the cross-section of the chamber 1 at the point of entry and hence to the volume of the space to be filled with gas from each orifice. By means of the arrangement shown the gas is introduced and distributed practically simultaneously and at a uniform rate throughout the mass of the charge, thus securing an exceptionally intimate contact therebetween under substantially identical conditions at all points. The headers 7 for collecting the spent gases are fed by means of similar inverted troughs 5a. Headers 6 and 7 are ranged on opposite sides of chamber 1 in uniformly staggered relation, thereby establishing conditions for introducing and withdrawing gases as nearly as may be at the same rate and volume in all parts of chamber 1. The spent gases collected in headers 7 are drawn off through laterals 9 into manifolds 11, and thence removed from the system. When the charge is finished, the dry, solid material is discharged by gravity through outlet 17 by opening valve 18, and when emptied a new charge may be fed in and the operation repeated.

When the duplex arrangement shown in Fig. 4 is employed the process is carried out in two stages with gravity feed of materials from the first stage to the second. An advantage of such arrangement is that the reaction time may be doubled without loss of output, while the charge is thoroughly mixed once during the process when it is being transferred from the upper to the lower chamber. The material is charged in at inlet 12 in amount to fill chamber 1', gate 15 being open and gate 20 closed, and the reaction started. When the reaction has been carried to any desired point, the charge in chamber 1' is discharged into chamber 1 by opening gate 20, the material being thoroughly turned over and mixed in the operation, and a fresh charge is admitted into chamber 1'. The gaseous reaction component is introduced through pipe 23, passes through preheater 22 and is delivered into chamber 1 by means of pipe 21, manifold 10, laterals 8, headers 6 and distributers 5. The gases from chamber 1 are collected in headers 7 and conveyed thence via pipes 19 to headers 7' of chamber 1', whence they are distributed throughout the charge therein through inverted troughs 5' and finally taken off through headers 6', laterals 8' and manifold 10'. The exit gases may then be passed through pipe 24 to a cooler 25 and thence discharged through pipe 26. If desired, the direction of travel of the gas through the apparatus may be reversed without otherwise materially altering the mode of operation described other than to interchange the preheater and the cooler.

The layout in Fig. 5 illustrates the manner of heating and maintaining the temperature of the charge in the reaction chamber 1. Combustion gases from furnace 35 pass through flue 36 into compartment 30 whence they are drawn through opening 32 and duct 33 by fan 31 and delivered into compartment 29 through opening 34. The hot gases then traverse tubes 4, giving up heat to the material of the charge, and issuing into compartment 30 again are in part recirculated and in part escape through stack 37. The capacity of the fan 31 is made large in proportion to the volume of the entire system, thus providing for a large volume of flow at a low velocity. The volume of hot gases admitted at 36 and of used gases vented at 37 is controlled to maintain the desired temperature conditions; and the speed of fan 31 is regulated to maintain the desired temperature drop through tubes 4, which, in general, is preferably held at about 5° to 10° C. By maintaining a low temperature drop in the tubes, burning the fuel with a minimum of excess air, recirculating the bulk of the heating gases and venting only a small amount, the heat of the gases is effectively conserved and a nearly uniform temperature is provided at all points within chamber 1. The heating gases are likewise employed in part for preheating the reaction gases in preheater 22 so that the latter gases are delivered to the chamber 1 at approximately the same temperature as that of the solid material therein. When the entire apparatus assembly is enclosed within a single housing 27 suitably protected by heat insulating material the heat losses by radiation, leakage and from other causes are reduced to a minimum.

In the foregoing description a preferred arrangement of apparatus parts has been shown, but the invention is not limited specifically thereto. Various modifications in details will be suggested to those experienced in carrying out operations related to those for which the present apparatus is designed and it is expressly understood that all such detailed modifications involving no materially altered mode of operation are comprehended within the scope of the present invention. For example, the flues 4 may be disposed vertically instead of horizontally; flues 4 and distributing troughs 5 may be arranged parallel to each other, instead of transversely as shown; the regular spacing and alternate arrangement of such flues and troughs may be variously modified, and the number of the one relative to the other may be changed in divers ways that will be readily apparent; equal spacing and regular alternation of flues and troughs, while being preferable, are not essential to the invention. The blower 31 may be located outside of the main casing, if desired, for greater accessibility in oiling, repairing, etc. without departing from the scope of the invention.

The reaction chamber and accessory equipment, pipe connections, fan, preheater, cooler, etc. may all be constructed of iron or steel. When the apparatus is employed for dehydrating magnesium chloride in an atmosphere of hydrochloric acid gas the corrosive action of the acid upon iron or steel, even when mixed with water vapor from the dehydration, may be substantially avoided by maintaining the temperature of such hydrochloric acid gas between 140° and 325° C., i. e. the temperature at which iron chloride commenced to absorb water and at which it will volatilize materially. The cooler 25 shown in Fig. 4 is advisedly located in a separate compartment within housing 27, so as to effect the cooling of the exit gases from reaction temperature by regulated exchange of heat with air or other medium preferably at a temperature not lower than 140° C. such that the gases leave the cooler at or above the latter temperature. Such partially cooled gases may then be further cooled in contact with surfaces of acid resisting materials, such as glass, stoneware, etc. the preliminary cooling in contact with iron having reduced the temperature to a point where the gas may be contacted with glass or similar apparatus without danger of cracking or otherwise damaging the same.

As already indicated, the herein described apparatus is particularly adapted for dehydrating magnesium chloride in an atmosphere of hydrochloric acid gas to form the anhydrous salt. The preliminary dehydration of normal hydrated magnesium chloride, $MgCl_2.6H_2O$, is conducted by drying in air, whereby a partially dehydrated product containing from 1 to 2 molecules of water of crystallization may be prepared with but little decomposition. It is also feasible to continue the air-drying until no more water as such is driven off, the so-called "end product" thus obtained by exhaustive air-drying consisting of a mixture of anhydrous magnesium chloride and magnesium oxychloride or oxide, such oxychloride or oxide largely predominating. Either one of the aforesaid preliminarily dried materials may then be subjected to further heating in an atmosphere of hydrochloric acid gas to drive off the remainder of the crystal water and convert the oxychloride or oxide to anhydrous magnesium chloride. In such latter operation it is necessary for practically satisfactory results to secure an intimate intermixture between the particles of material being dried and of the hydrochloric acid gas, not only to effect the disengagement of water from the particles and the conversion of the oxychloride or oxide back to chloride, but also to facilitate the removal of the liberated water vapor from the zone of drying. Such intimate intermixture of gaseous and solid materials and the rapid removal of water vapor is achieved with conspicuous advantage by means of the improved method and arrangement of apparatus just described. Furthermore the drying and reacting take place under more nearly uniform conditions than can be attained by other means or methods.

The temperature for drying the partially dehydrated magnesium chloride may be varied at will between the limits of 140° and 325° C., already referred to, but the higher temperatures are preferred on account of the more rapid drying rate. In practice, therefore, the temperature of the heating gases entering the flues 4 of the dryer is maintained at approximately 325° C. The rate of circulation of the heating gases is preferably regulated so that the temperature drop through the flues is about 5° C. The hydrochloric acid gas introduced is preferably to be substantially dry. In order for drying of the chloride to take place under the conditions given the water vapor content of the atmosphere contiguous thereto must be less than 17 per cent. by weight, and, of course, the lower the water vapor content the more rapidly will the explusion of water from the hydrated salt take place. Consequently we have found it convenient to introduce the hydrochloric acid gas at such rate that the issuing gases from the chamber have a water vapor content of about 4 to 5 per cent., although we may maintain a somewhat slower or more rapid gas flow provided that the water vapor content of the issuing gases is held below 17 per cent. by weight. The charge of material is held in the dryer under the conditions just stated until dehydration is complete, the actual time required depending upon the amount of the charge, the area of heating surface, and other factors.

The foregoing example illustrates one process wherein the principle of the invention and the apparatus described may be advantageously utilized. However, the invention is capable of wider application, and is not limited to the specific example given. Other examples of processes wherein a solid in comminuted form and a gas are contacted at ordinary or at moderately elevated temperatures, e. g. up to about 400° C,. and to which the herein described apparatus may be readily adapted, are the removal of gasoline from natural gas, or of benzine from coke-oven gas, by adsorption with activated charcoal; purifying coal gas from hydrogen sulphide by contacting with ferric oxide or hydroxide; removing carbon bisulphide from coal gas by reacting with steam at about 230° C. in presence of colloidal ferric hydroxide as catalyst. In such processes the solid material may exercise quite diverse functions in various cases, i. e. it may enter into the reaction with the gas, or it may act as an adsorbing medium, or it may serve as a catalyst, or in other ways take a necessary part in the reaction. The common feature present in all such processes such as are illustrated by the examples just given, is that a gaseous material is intimately contacted with a solid material in a state of subdivision.

In the activated charcoal process for removing gasoline from natural gas, the gas has been heretofore passed through a bed of the finely divided charcoal at ordinary temperature until the charcoal has become saturated with the gasoline; then the saturated charcoal has been treated directly with steam to carry off the gasoline vapors, which were condensed and separated from the water. By employing an apparatus constructed according to the present invention, the reaction chamber 1 is filled with the charcoal, the gas to be scrubbed is admitted through manifold 10 and distributed within the body of adsorbent in the manner previously described, while the exit gases pass out by way of manifold 11, the process during this stage being carried out at ordinary temperature. When the absorption is complete, heating gases may be passed through tubes 4 to heat the saturated charcoal to a sufficient temperature to drive off the gasoline and leave the charcoal in condition to absorb a fresh charge of gasoline. Finally by suitable arrangement the revivified charcoal bed may be cooled by passing cold air through tubes 4, and the preceding operations repeated. By such procedure the direct steaming out of the charcoal and subsequent separation of the gasoline and condensed water is supplanted by an indirect heating and cooling which avoids any such separation and which is carried out under conditions to effect a rapid and efficient transfer of heat throughout the charcoal body.

Similarly in purifying coal gas from hydrogen sulphide by passing the gas through or over beds of ferric oxide or hydroxide, the process is ordinarily carried on until the absorbing material has become saturated with the iron sulphide formed so as to have lost its effectiveness. The absorbent is then revivified by exposing it to the air, whereby through oxidation the iron sulphide is reconverted to the oxide with liberation of free sulphur. Considerable heat is developed in the oxidation, and since it is imperative that the temperature of the mass be not allowed to rise sufficiently to melt the sulphur, it has been found necessary to carry out the oxidation of the iron compound gradually at the expenditure of considerable time. By adapting the apparatus of the present invention to such process, the chamber 1 would be filled with the iron oxide absorbent, and the coal gas introduced into the bed of absorbent in the regular way, the purified gas passing out through the exit passages. When the absorbent became exhausted, the flow of gas would be shut off and air introduced into the mass to effect the reoxidation, while the temperature of the oxidizing mass would be controlled by passing cold air through tubes 4.

In the process for purifying coal gas from carbon bisulphide, reactor 1 would be filled with the catalyst consisting of a colloidal ferric hydroxide, and the mass heated to reaction temperature, e. g. about 230° C., by passing hot combustion gases through tubes 4. Then the gas to be treated would be introduced into the catalyst bed, the temperature being maintained at the desired point, and the treated gases would pass out through the exit passages.

The examples just given are mentioned merely as illustrations of the general applicability of the improved method and apparatus herein described, whereby a gaseous reactant may be contacted with a solid reactant in granular or other divided form under conditions for effecting a uniform and rapid distribution of gas throughout the body of solid material and also for maintaining a close regulation of temperature therein either by heating or cooling or both alternately. The apparatus described is adapted for use at atmospheric pressure or under slightly increased or reduced pressure. All parts thereof, except the furnace and the heat insulating walls and partitions of the housing, may be constructed of iron or steel according to the usual methods of fabrication and erection. The chamber 1 and accessory parts are preferably to be of welded construction throughout, thus insuring permanent gas-tightness and freedom from gas leakage. The tubes 4 running lengthwise of the chamber and the troughs 5 and 5a extending crosswise thereof are firmly secured to the walls and form braces and supports for holding the chamber walls rigid and preventing bulging or distorting. Such all-metal construction permits rapid transfer of heat between the charge of solid material and the heating or cooling gases in tubes 4, and such heating or cooling may be assisted by preheating or precooling the reaction gases before introducing the same into the reaction chamber. The arrangement of tubes 4 and distributing troughs 5 and 5a within the body of solid material provides for rapid and nearly uniform heating thereof as well as a regular and evenly distributed flow of gases through the body of solid material. Finally by completely enclosing the reacting chamber, piping, circulating fan, preheater and, if used, the furnace for supplying hot combustion gases within a single heat-insulated housing the entire system is rendered as nearly as possible independent of external temperature conditions, the leakage of heat to or from the system is largely prevented, and economy in construction is gained by avoiding the need for separately insulating the individual parts of the system. Positive temperature control within the system may be maintained at all times by suitably regulating the speed of the circulating fan, and controlling the quantity of heating or cooling gases supplied and vented.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:—

1. In apparatus of the character described, the combination of a closed rectangular chamber provided with a closable top charging inlet and bottom discharge outlet, a plurality of horizontal flues in uniformly spaced relation extending lengthwise of said chamber and being secured in the end walls thereof, means for supplying a gaseous temperature regulating medium to said flues, a plurality of horizontal inverted troughs disposed transversely of said chamber and being secured to the lateral walls thereof in banks between alternate rows of said flues, headers joining one end of said inverted troughs in each alternate bank thereof and communicating with an inlet manifold, similar headers joining the opposite ends of the inverted troughs in the remaining banks thereof and communicating with an outlet manifold and means for supplying a gas to said inlet manifold and for withdrawing a gas from said outlet manifold.

2. In apparatus of the character described, the combination of a closed rectangular chamber provided with a closable top charging inlet and bottom discharge outlet, said first chamber being superposed upon and communicating by means of said bottom discharge outlet with a second chamber of similar form, each chamber containing a plurality of horizontal flues in uniformly spaced relation extending lengthwise of the chamber and being secured in the end walls thereof, means for supplying a gaseous temperature regulating medium to said flues, a plurality of horizontal inverted troughs disposed transversely of each chamber and secured to the lateral walls thereof in banks between alternate rows of said flues, headers joining one end of said inverted troughs in each alternate bank thereof and communicating in each chamber with a manifold, one such manifold serving as a gas inlet and the other as a gas outlet, other headers joining the opposite ends of the inverted troughs in the remaining banks thereof, each of such latter headers in one chamber communicating with a similar header in the other chamber, means for supplying a gas to said inlet manifold and means for withdrawing a gas from said outlet manifold.

3. In apparatus of the character described, the combination of a closed rectangular chamber provided with a closeable top charging inlet and bottom discharge outlet, a plurality of horizontal flues in uniformly spaced relation extending lengthwise of said chamber and being secured in the end walls thereof, a plurality of horizontal inverted troughs disposed transversely of said chamber and being secured to the lateral walls thereof in banks between alternate rows of said flues, headers joining one end of said inverted troughs in each alternate bank thereof and communicating with an inlet manifold, similar headers joining the opposite ends of the inverted troughs in the remaining banks thereof and communicating with an outlet manifold, means for supplying a gas to said inlet manifold and for withdrawing a gas from said outlet manifold, a heat insulating housing enclosing said chamber and forming with the exterior walls thereof passages leading to and from said flues and a blower adapted to circulate a gaseous temperature regulating medium through said passages and flues.

4. In apparatus of the character described, the combination of a closed rectangular chamber provided with a closeable top charging inlet and bottom discharge outlet, said first chamber being superposed upon and communicating by means of said bottom discharge outlet with a second chamber of similar form, each chamber continuing a plurality of horizontal flues in uniformly spaced relation extending lengthwise of the chamber and being secured in the end walls thereof, a plurality of horizontal inverted troughs disposed transversely of each chamber and secured to the lateral walls thereof in banks between alternate rows of said flues, headers joining one end of said inverted troughs in each alternate bank thereof and communicating in each chamber with a manifold, one such manifold serving as a gas inlet and the other as a gas outlet, other headers joining the opposite ends of the inverted troughs in the remaining banks thereof, each of such latter headers in one chamber communicating with a similar header in the other chamber, means for supplying a gas to said inlet manifold, means for withdrawing a gas from said outlet manifold, a heat insulating housing enclosing said chambers and forming with the exterior walls thereof passages leading to and from said flues and a blower adapted to circulate a gaseous temperature regulating medium through said passages and flues.

5. In apparatus of the character described the combination of a closed rectangular chamber provided with a closable top charging inlet and bottom discharge outlet, a plurality of flues in uniformly spaced relation extending lengthwise of the chamber and being secured in the end walls thereof, a plurality of horizontal inverted troughs disposed transversely of said chamber and being secured to the lateral walls thereof in banks between alternate rows of said flues, headers joining one end of said inverted troughs in each alternate bank thereof and communicating with an inlet manifold, similar headers joining the opposite ends of the inverted troughs in the remaining banks thereof and communicating with an outlet manifold, means for supplying a gas to said inlet manifold and for withdrawing a gas from said outlet manifold, a furnace for supplying hot combustion gases to said flues, a heat insulating housing enclosing said chamber and said furnace and forming with the exterior walls thereof passages leading to and from said flues and a blower adapted to circulate said combustion gases through said passages and flues.

6. In apparatus of the character described, the combination of a closed rectangular chamber provided with a closable top charging inlet and bottom discharge outlet, said first chamber being superposed upon and communicating by means of said bottom discharge outlet with a second chamber of similar form, each chamber containing a plurality of flues in uniformly spaced relation extending lengthwise of the chamber and being secured in the end walls thereof, a plurality of horizontal inverted troughs disposed transversely of each chamber and secured to the lateral walls thereof in banks between alternate rows of said flues, headers joining one end of said inverted troughs in each alternate bank thereof and communicating in each chamber with a manifold, one such manifold serving as a gas inlet, and the other as a gas outlet, other headers joining the opposite ends of the inverted troughs in the remaining banks thereof, each of such latter headers in one chamber communicating with a similar header in the other chamber, means for supplying a gas to said inlet manifold, means for withdrawing a gas from said outlet manifold, a furnace for supplying hot combustion gases to said flues, a heat insulating housing enclosing said chambers and said furnace and forming with the exterior walls thereof passages leading to and from said flues and a blower adapted to circulate said combustion gases through said passages and flues.

7. In apparatus of the character described, the combination of a closed rectangular chamber provided with a closable top charging inlet and bottom discharge outlet, a plurality of flues distributed with substantial uniformity throughout the space within said chamber, said flues extending lengthwise of the chamber and being secured in the end walls thereof, a plurality of horizontal inverted troughs disposed transversely of said chamber and being secured to the lateral walls thereof in banks between alternate rows of said flues, headers joining one end of said inverted troughs in each alternate bank thereof and communicating with an inlet manifold, similar headers joining the opposite ends of the inverted troughs in the remaining banks thereof and communicating with an outlet manifold, means for supplying a gas to said inlet manifold including a preheater for such gas, means for withdrawing a gas from said outlet manifold, a furnace for supplying hot combustion gases to said flues and said preheater, a heat insulating housing enclosing said chamber, said furnace and said preheater and forming with the exterior walls of said chamber passages leading to and from said flues and a blower adapted to circulate said combustion gases through said passages and flues.

8. In apparatus of the character described, the combination of a closed rectangular chamber provided with a closable top charging inlet and bottom discharge outlet, said first chamber being superposed upon and communicating by means of said bottom discharge outlet with a second chamber of similar form, each chamber containing a plurality of flues distributed with substantial uniformity throughout the space therein, the same extending lengthwise of the chamber and being secured in the end walls thereof, a plurality of horizontal inverted troughs disposed transversely of each chamber and secured to the lateral walls thereof in banks between alternate rows of said flues, headers joining one end of said inverted troughs in each alternate bank thereof and communicating in each chamber with a manifold, one such manifold serving as a gas inlet, and the other as a gas outlet, other headers joining the opposite ends of the inverted troughs in the remaining banks thereof, each of such latter headers in one chamber communicating with a similar header in the other chamber, means for supplying a gas to said inlet manifold, including a preheater for such gas, means for withdrawing a gas from said outlet manifold, a furnace for supplying hot combustion gases to said flues and said preheater, a heat insulating housing enclosing said chambers, said furnace and said preheater and forming with the exterior walls of said chamber passages leading to and from said flues and a blower adapted to circulate said combustion gases through said passages and flues.

Signed by us this 8th day of February, 1930.

EDWIN O. BARSTOW.
SHELDON B. HEATH.